US010753720B2

(12) United States Patent
Schultz

(10) Patent No.: US 10,753,720 B2
(45) Date of Patent: Aug. 25, 2020

(54) END PLAY MEASUREMENT APPARATUS FOR LINEAR ACTUATORS

(71) Applicant: Kenneth D. Schultz, Tyndall (CA)

(72) Inventor: Kenneth D. Schultz, Tyndall (CA)

(*) Notice: Subject to any disclaimer, the term of this patent is extended or adjusted under 35 U.S.C. 154(b) by 188 days.

(21) Appl. No.: 15/993,925

(22) Filed: May 31, 2018

(65) Prior Publication Data
US 2018/0364020 A1 Dec. 20, 2018

Related U.S. Application Data

(60) Provisional application No. 62/522,330, filed on Jun. 20, 2017.

(51) Int. Cl.
*G01B 5/14* (2006.01)
*G01B 5/00* (2006.01)

(52) U.S. Cl.
CPC ............. *G01B 5/14* (2013.01); *G01B 5/0002* (2013.01)

(58) Field of Classification Search
CPC ... G01B 3/22; G01B 3/28; G01B 5/14; G01B 5/146; G01B 5/18; G01B 5/20
USPC ..................................................... 33/832, 833
See application file for complete search history.

(56) References Cited

U.S. PATENT DOCUMENTS

| | | | | | |
|---|---|---|---|---|---|
| 2,398,171 | A * | 4/1946 | Zimmermann | .......... | G01B 3/48 33/549 |
| 2,885,994 | A * | 5/1959 | Butera | ..................... | G01B 3/22 116/316 |
| 2,965,970 | A * | 12/1960 | Rocheleau | .......... | G01B 5/0002 33/832 |
| 3,197,877 | A * | 8/1965 | Aldeborgh | ............... | G01B 3/28 33/542 |
| 3,319,339 | A * | 5/1967 | Marconi | ................... | G01B 3/30 33/832 |
| 4,251,922 | A * | 2/1981 | Perlotto | ............. | B23Q 17/2225 33/1 M |
| 4,553,331 | A * | 11/1985 | Salaam | ..................... | G01B 5/25 33/533 |
| 4,930,954 | A * | 6/1990 | Dague | ................ | B23Q 11/1084 248/229.16 |
| 5,097,604 | A * | 3/1992 | Brown | ..................... | G01B 5/20 33/613 |
| 6,058,767 | A * | 5/2000 | Calvin | .................. | G01M 13/04 33/517 |
| 6,415,526 | B1 * | 7/2002 | Buckner, III | ............ | G01B 3/28 33/522 |

(Continued)

*Primary Examiner* — Christopher W Fulton
(74) *Attorney, Agent, or Firm* — Kyle R Satterthwaite; Ryan W Dupuis; Ade & Company Inc.

(57) ABSTRACT

An measurement apparatus for measuring end play of a linear actuator features a dial indicator and a primary mounting clamp. A plunger of the dial indicator is displaceable back and forth to cause an indicator needle to move about a graduated dial to reflect a measurement of said displacement. The primary mounting clamp has a clamp body configured to releasably clamp onto an output rod of said linear actuator, and a dial support body projecting outwardly from said clamp body. The dial support body is configured to the support the dial indicator thereon in a working position in which the plunger reaches axially along the output rod toward a gear housing of said linear actuator to abut against a contact surface carried on a stationary portion of the actuator relative to which the output rod undergoes displacement during operation of said actuator.

13 Claims, 4 Drawing Sheets

(56) References Cited

U.S. PATENT DOCUMENTS

2004/0200088 A1* 10/2004 Ishii .................. G01B 3/22 33/832
2008/0155846 A1* 7/2008 Li .................... G01B 3/22 33/533

* cited by examiner

END PLAY MEASUREMENT APPARATUS FOR LINEAR ACTUATORS

CROSS-REFERENCE TO RELATED APPLICATIONS

This application claims benefit under 35 U.S.C. 119(e) of U.S. Provisional Application No. 62/522,330, filed Jun. 20, 2017, the entirety of which is incorporated herein by reference.

FIELD OF THE INVENTION

The present application relates generally to linear actuators, and more particularly to equipment and methods for measuring end play in the linear actuators of aircraft landing gear.

BACKGROUND

In the field of aviation, linear actuators used for the nose and landing gear of some aircraft require period measurement of end play in the actuator to ensure it is within allowable tolerances for ongoing safe operation of the aircraft. While aircraft requiring such periodic actuator end play checks include general guidance on the measurement process in their applicable maintenance manuals, the instructions in at least some cases are vague, and require that the maintenance personnel responsible for these aircraft derive a suitable test rig for such purposes using off-the-shelf equipment. To Applicant's knowledge, there is no commercially available product by which the measurement process can be simplified or standardized.

SUMMARY OF THE INVENTION

According to one aspect of the invention, there is provided an end play measurement apparatus for measuring end play of a linear actuator, said apparatus comprising:

a dial indicator having a graduated dial and a plunger radiating outward therefrom in a radial direction, said plunger being displaceable back and forth in said radial direction and connected to an internal mechanism of the dial indicator by which displacement of said plunger causes an indicator needle of said dial indicator to move about said graduated dial to reflect a measurement of said displacement; and a primary mounting clamp comprising a clamp body configured to releasably clamp onto an output rod of said linear actuator, and a dial support body projecting outwardly from said clamp body and configured to the support the dial indicator thereon in a working position in which the plunger reaches axially along the output rod toward a gear housing of said linear actuator to abut against a contact surface carried on a stationary portion of the actuator relative to which the output rod undergoes displacement during operation of said actuator.

Preferably the mounting clamp is a quick release clamp with tool-free coupling and decoupling functionality.

Preferably the mounting clamp is a snap-on clamp.

Preferably the mounting clamp comprises a pair of jaws reaching in a common direction from the dial support body and leaving an open mouth between distal tips of said jaws to accommodate receipt of the output rod of the actuator through said open mouth.

Preferably said jaws are resiliently flexible away from one another to widen said open mouth from a default width thereof to an expanded width exceeding a diameter of the output rod.

Preferably there is a secondary clamp of larger clamp diameter than the primary mounting clamp for releasable clamping of the secondary clamp onto a tubular part of the actuator's stationary portion near an open end of said tubular part from which the output rod extends, said secondary clamp having a contact body projecting outwardly from said clamp body to align with the dial support body of the mounting clamp and define said contact surface that receives a distal working end of the plunger, whereby the plunger is displaceable by relative movement between the output rod and the tubular part of the actuator in order to show a measure of said relative movement on the dial indicator.

Preferably the secondary clamp is a quick release clamp with tool-free coupling and decoupling functionality.

Preferably the secondary clamp is a snap-on clamp.

Preferably the clamp body of the secondary clamp comprises a pair of jaws reaching in a common direction from the contact body and leaving an open mouth between distal tips of said jaws to accommodate receipt of the tubular part of the actuator through said open mouth.

Preferably said jaws are resiliently flexible away from one another to widen said open mouth from a default width thereof to an expanded width exceeding said diameter of said tubular part of the actuator.

Preferably there is also an alternative mounting clamp that, like the primary mounting clamp, has a respective clamp body and a respective dial support body projecting outwardly therefrom to carry the dial indicator, the respective clamp body of said alternative mounting clamp having a reduced axial thickness relative to the clamp body of said primary mounting clamp, at least at an inner area of said respective clamp body that immediately surrounds the output rod of the actuator when clamped thereto, whereby said reduced axial thickness accommodates use of said alternative mounting clamp in place of said primary mounting clamp when the output rod of the actuator is in a substantially collapsed state that substantially reduces an available circumferential clamping area of the output rod left exposed outside a remainder of the actuator.

Preferably the dial indicator comprises a transition collar that is attached to the graduated dial and from which the plunger of the dial indicator projects, and the respective dial support body of the alternative mounting clamp comprises a respective axial through-bore therein sized to receive said transition collar of the dial indicator in a frictionally engaged manner holding said dial indicator securely on said primary alternative clamp.

Preferably the dial support body of the primary mounting clamp also comprises an axial through-bore therein sized to receive said transition collar of the dial indicator in a frictionally engaged manner holding said dial indicator securely on said primary mounting clamp.

Preferably the dial support body of the primary mounting clamp comprises a second axial through-bore therein for selective receipt of the dial indicator clamp in either of said axial through-bores of said primarily mounting clamp according to a location of the contact surface on a current linear actuator being tested.

According to another aspect of the invention, there is provided a method taking an end play measurement of a linear actuator, said method comprising:

(a) removably attaching a mounting clamp to an output rod of a linear actuator;

(b) supporting a dial indicator on said mounting clamp in a position in which a distal working end of a plunger of the dial indicator abuts a contact surface carried at a stationary portion of the actuator relative to which the output rod is displaceable by operation of said actuator; and (c) monitoring a positional change of the indicator needle on the graduated dial that takes place between exertion of a pulling force on said output rod and exertion of a pushing force on said output rod, and thereby obtaining an end play measurement of said actuator as a difference between values respectively indicated on said graduated dial by the indicator needle during the exertion of the pulling and pushing forces.

In one embodiment, step (a) may comprise sliding said mounting clamp along said output rod toward the contact surface to push the distal working end of the plunger of the dial indicator into contact with the contact surface carried on said stationary portion of the actuator.

In such instance, sliding the primary mounting claim in step (a) may comprise sliding said primary mounting clamp beyond a state of contact between the distal working end of the plunger and the contact surface to achieve a partially retracted state of said plunger toward the graduated dial; and step (c) may comprise performing push and pull strokes on the output rod of the actuator after releasing said primary mounting clamp, and during performance of said push and pull strokes on the output rod, measuring a difference between a position of the indicator need on the graduated dial at a terminal point of a pull stroke and a position of the indicator needle on the graduated dial at a terminal point of a push stroke, thereby obtaining the end play measurement of said actuator.

The method may include, before step (b), removably mounting the contact surface on the stationary part of the actuator.

In such instance, the method may include removably mounting a secondary mounting clamp to a tubular part of the actuator's stationary portion to define the contact surface thereon, said tubular part having an open end through which the output rod of the actuator extends.

In another embodiment, step (a) may comprise, with the output rod in a substantially collapsed state that substantially reduces an available circumferential clamping area of the output rod left exposed outside a remainder of the actuator, attaching the mounting clamp to said reduced circumferential clamping area.

In such an embodiment, the mounting clamp may comprise an axially recessed end, and step (a) may comprise clamping the mounting clamp around the reduced circumferential clamping area in a position where the axially recessed end receives a proximal end of a compression spring that is coiled around the output rod of the actuator.

In such instance, step (a) may comprise selecting the mounting clamp from among a set of clamps that includes said selected mounting clamp and a thicker mounting clamp that is axially thicker than said selected mounting clamp, at least at an inner area of said selected mounting clamp.

The method may include using the thicker mounting clamp in another performance of steps (a) through (c) with the output rod of the actuator in a more extended position revealing a greater circumferential area thereof.

In such instance, the method may include using the same dial indicator in steps (a) through (c) as in said other performance of steps (a) through (c), and swapping said dial indicator between the mounting clamp and the thicker mounting clamp between repetitions of steps (a) through (c).

The actuator may comprise a landing gear actuator of an aircraft.

The actuator may comprise a nose landing gear actuator of an aircraft.

The actuator may comprise a main landing gear actuator of an aircraft.

The method preferably includes attaching the mounting clamp to the output rod of the actuator in a tool-free manner.

The method preferably includes attaching the mounting clamp to the output rod of the actuator in a snap-fit manner.

The method preferably includes pushing an open mouth in a clamp body of the mounting clamp against a side of the output rod, thereby forcing apart a pair of clamping jaws at distal ends thereof to further open said open mouth to a widened state exceeding a diameter of said output rod until to accommodate passage of said output rod through said open mouth, whereupon the clamping jaws resiliently bias back toward one another to narrow the open mouth to and embrace the diameter of the output rod between said jaws.

The method preferably includes attaching the dial indicator to the mounting clamp by way of a friction fit therebetween.

The dial indicator may comprise a transition collar that is attached to the graduated dial and from which the plunger of the dial indicator projects, in which case attaching the dial indicator to the mounting clamp preferably comprises inserting the plunger through an axial through-bore of the mounting clamp until the collar is frictionally engaged in said axial through-bore.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
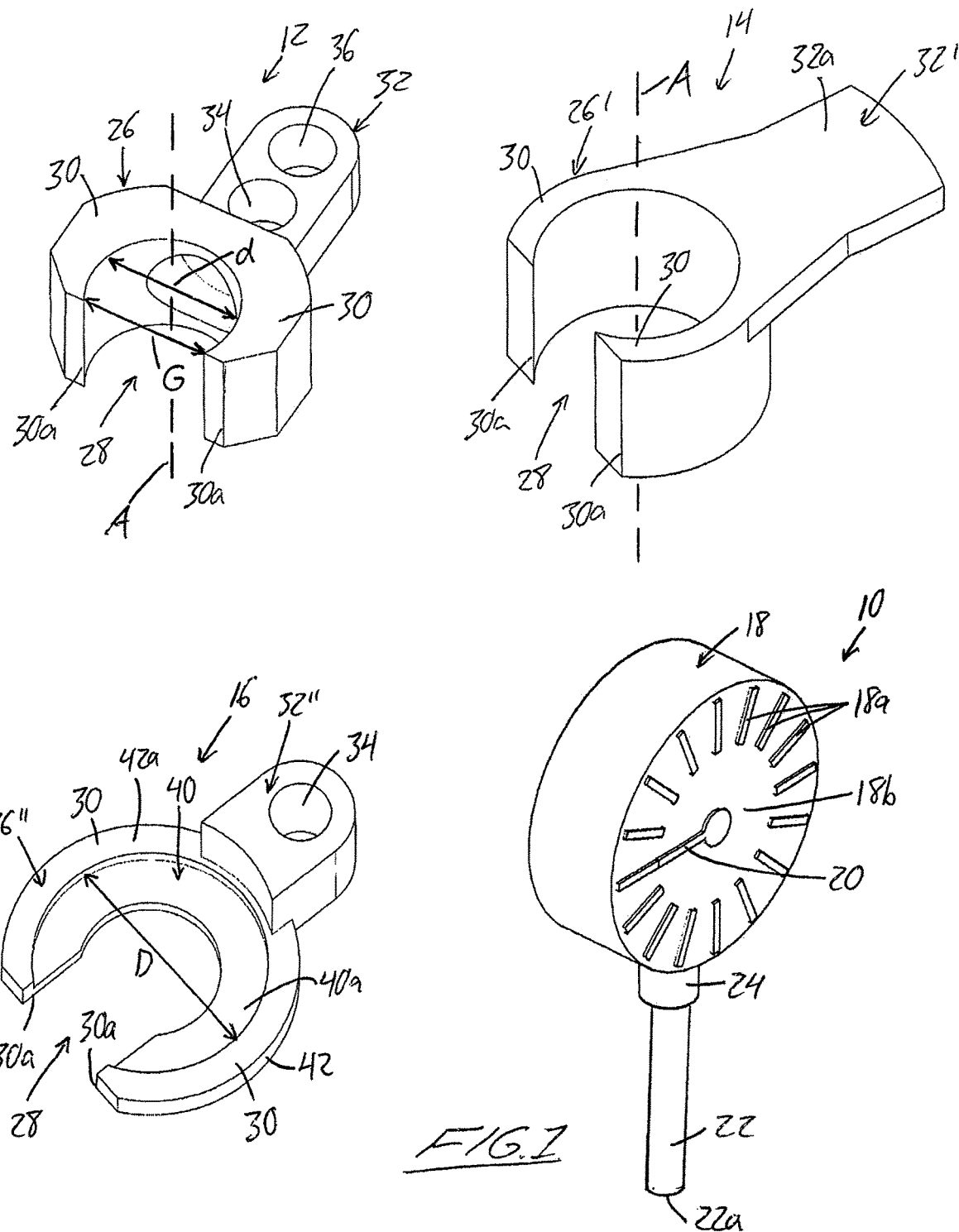
FIG. 1 is a perspective view of a four piece kit for measuring end play of linear actuators in nose and main landing gears of an aircraft.

FIG. 1 illustrates one embodiment of the present invention in the form of a four-piece kit operable to measure the end play of both a nose landing gear actuator and main landing gear actuator of an aircraft.

Figure 2:
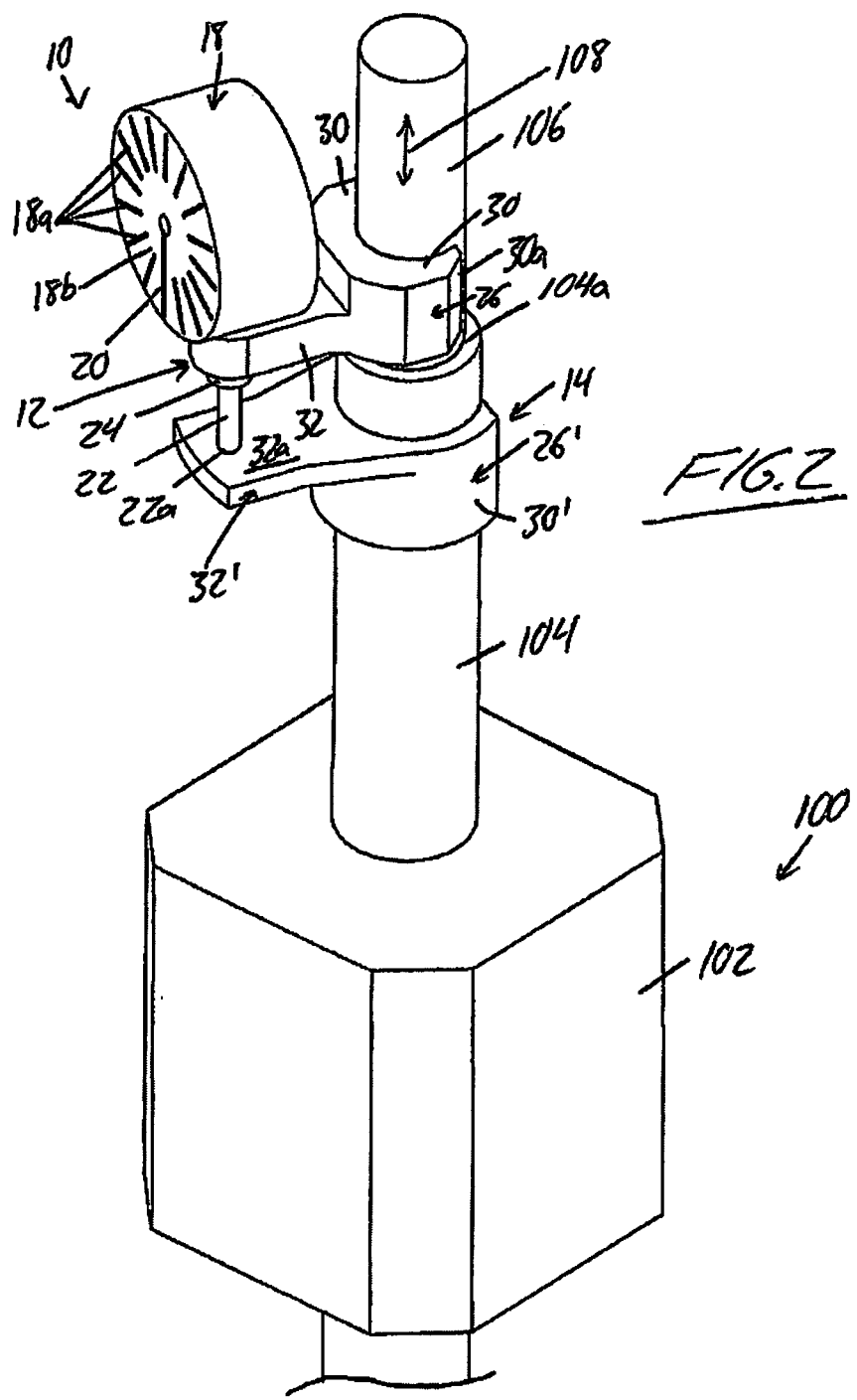
FIG. 2 is a perspective view illustrating use of two clamps and a dial indicator from the kit of FIG. 1 to measure the end play of a main landing gear actuator.
Figure 3:
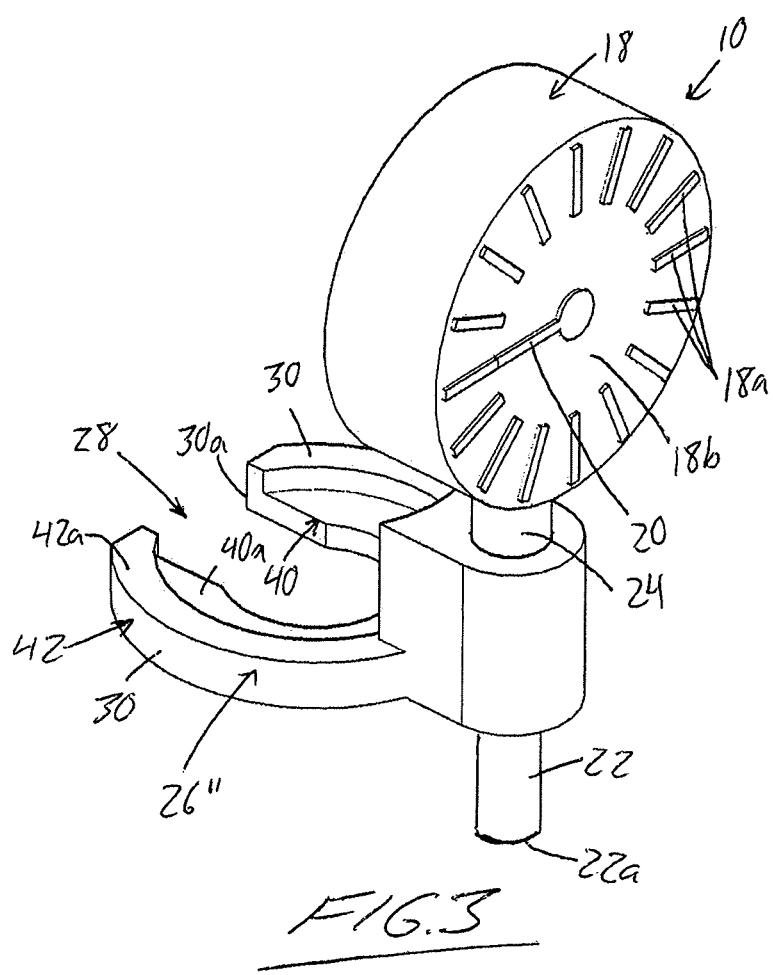
FIG. 3 is a perspective view illustrating assembly of the third clamp of the FIG. 1 kit with the dial indicator thereof.

FIG. 2 shows a type of linear actuator 100 used for the main landing gear of select commercially available aircraft. The actuator features a stationary gear housing 102, a tubular extension 104 projecting axially from one end of the housing 102 and containing an internal screw mechanism rotatably driven by the gear train inside the gear housing when coupled to the driven shaft of an accompanying motor (not shown), and an output rod 106 of the actuator that is telescopically received in the tubular extension 104 and projects therefrom at an open end 104a of the tubular extension that is situated distally of the stationary housing 102. The output rod 106 internally carries a nut member whose internal threading is mated with the internal screw mechanism so that the driven operation of the screw mechanism linearly displaces the output rod 106 back and forth in the axial direction denoted by double headed arrow 108. Such linear actuators are well known, and thus illustrated and described with only minimal detail herein.

Figure 4:
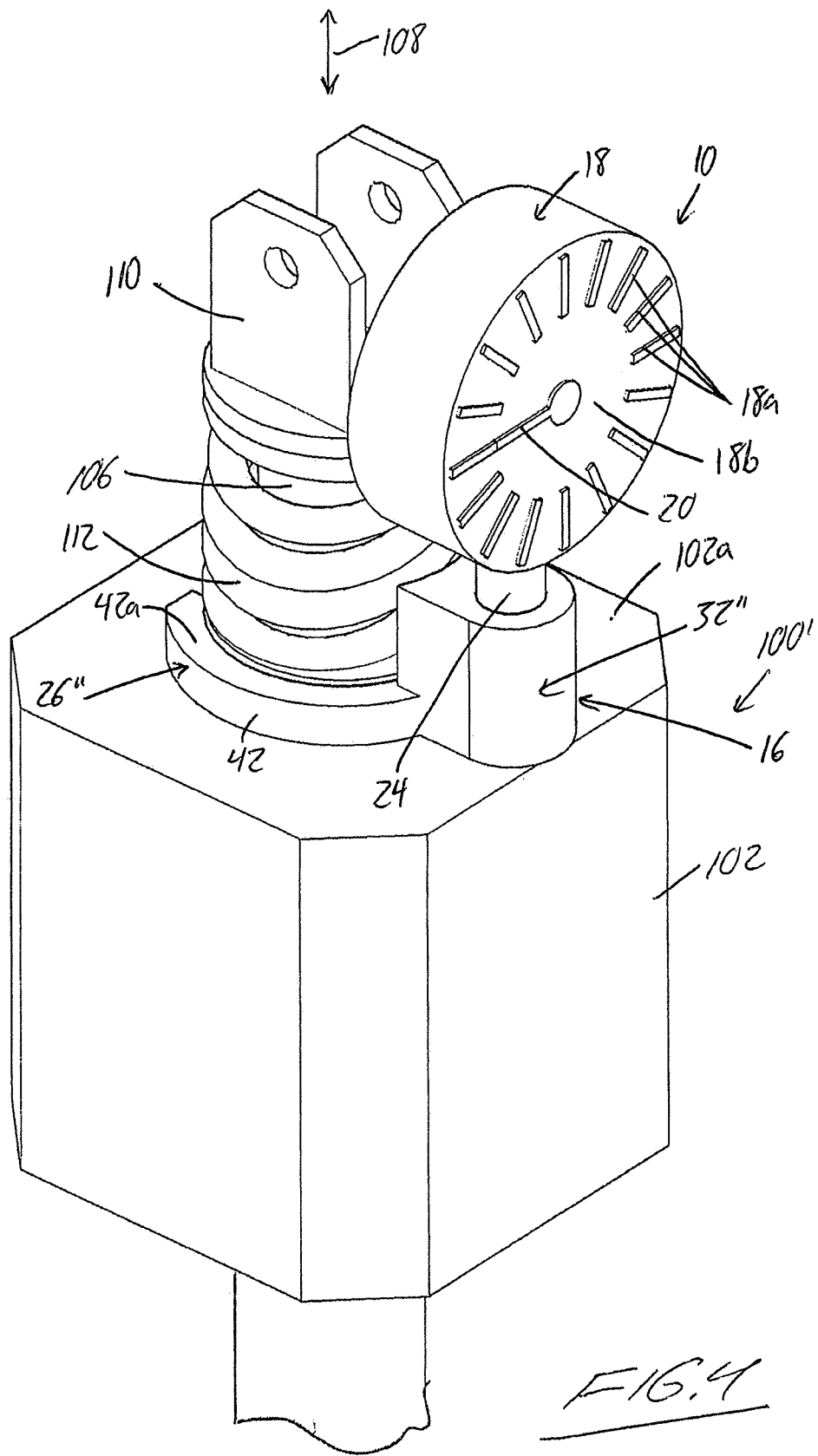
FIG. 4 is a perspective view illustrating use of the clamp and dial indicator of FIG. 3 on a nose landing gear actuator.

FIG. 4 shows another style of linear actuator 100 similarly featuring a stationary gear housing 102, and an output rod 106 that is displaceable back in forth relative to the housing in axial direction 108 by a screw mechanism that is driven by an external motor (not shown) via a gear train contained within the stationary housing 102. In this actuator 100', the output rod 106 projects directly from a hole in a respective end wall 102a of the gear housing, rather than from a tubular extension at this end of the housing. The actuator of FIG. 4 is shown with a typical assembly of terminal components at the distal end of the output rod, particularly a clevis 110 by which the output rod 106 of the actuator is connected to other landing gear components when installed on the aircraft, and a compression spring 112 coiled around the output rod 106 to distally bias the clevis 110 away from the housing 102 in the axial direction 108 of the actuator. A similar terminal assembly is omitted from the actuator 100 of FIG. 2 for illustrative convenience.

Turning back to FIG. 1, the end play measurement kit features a dial indicator 10, a primary mounting clamp 12, a secondary contact surface clamp 14, and an alternative mounting clamp 16 that is used in place of the primary mounting clamp 12 in particular instances. The dial indicator 10, a known of type of tool for measuring linear displacement, is a commercially available dial indicator of conventional construction, where a graduated dial 18 features a series of numbered graduations 18a printed or otherwise affixed on a face of the dial. The graduations 18a are arranged in a circular array around a center point of the dial face on radial lines of equal interval therearound. An indicator needle 20 is pinned at the center of the dial for pivotal motion therearound over the dial face 18b. A plunger 22 projects radially from the circumferential periphery of the dial through a hollow cylindrical transition collar 24 affixed thereto, and terminates at a distal working end 22a spaced radially outward from the dial 18. The plunger 22 is linearly displaceable back in forth relative to the dial 18, and is operably connected to the indicator needle 20 by an internal gear mechanism housed within the dial. This internal gearing of the dial indicator converts the linear displacement of the plunger 22 into angular movement of the indicator need 20 around the dial 18. The plunger 22 is spring biased into an extended state of maximum reach from the dial 18, and the numerical values (not shown) of the graduations are accordingly used to measure a linear distance by which the plunger is displaced out of this default extended state when force is exerted on the working distal end 22a of the plunger.

The primary mounting clamp 12 features a generally C-shaped clamp body 26 having an open mouth 28 defined between the terminal ends of the clamp body's C-shape. The curvature of the C-shaped is centered on a reference axis A, which defines an axial direction of the primary mounting clamp 12 that matches the axial direction of the linear actuator whose axial play is being measured during use of the clamp. The clamp body 26 is symmetric about an imaginary plane of symmetry (not shown) that contains reference axis A and perpendicularly bisects the mouth 28 of the clamp body. Each half of the C-shape on a respective side of the plane of symmetry defines a respective jaw 30 that terminates in a distal tip 30a at a respective side of the open mouth 28.

From a closed side of the clamp body's C-shape, where the two jaws are connected together across the plane of symmetry, a dial support body 32 projects outward from the C-shaped clamp body 26 in a radial direction that is perpendicular to reference axis A and coincident with the plane of symmetry. Like the clamp body, the support body 32 is symmetrically bisected by the plane of symmetry. The C-shape of the clamp body spans more than 180-degrees, whereby a gap width G of the mouth 28 at the distal tips 30a of the jaws is narrower than the overall diameter d of the jaw space, as measured perpendicularly of the plane of symmetry at the central axis to define the widest point of the clamp's jaw space.

The primary mounting clamp 12 is made of a plastic material of sufficient rigidity to normally maintain the above described shape, and thereby normally maintain the predetermined gap width G across the open mouth 28 of the C-shaped clamp body 26 between the distal tips 30a of the jaws 30. This default gap width G is selected to be less than the outer diameter of the output rod 106 of the actuators on which the kit is intended for use, while the default diameter d of the jaw space is selected to be generally equal to, or slightly lesser than, the outer diameter of the actuator's output rod 106. While the clamp body is sufficiently rigid to normally maintain its predetermined shape, the jaws 30 of the clamp body are resiliently flexible away from one another at their distal ends 30a in the presence of sufficient prying force to widen the mouth 28 and increase the gap width G to a value greater than the diameter of the actuator's output rod 106. Such temporary widening of the clamp mouth 28 enables the mounting clamp 12 to be clamped onto the output rod 106 of the actuator into a secured position embracing circumferentially therearound, as shown in FIG. 2.

To accomplish this, the open mouth 28 of the clamp body 26 is urged toward the output rod 106 of the actuator until the distal tips 30a of the jaws 30 press against the circumferential periphery of the rod 106, whereupon application of sufficient force will momentarily force the distal tips 30a of the clamp jaws 30 apart, widening the mouth 28 of the clamp 12 into equality with the output rod's diameter, whereupon the distal tips 30a of the jaws 30 will slip across a diametral plane of the rod 106, and snap back toward one another on the far side of this plane. The primary mounting clamp 12 thus easily snap-fits onto the output rod 106 of the actuator to enable simple, tool-free installation thereon. Likewise, the primary mounting clamp can be manually removed without the use of any tools through manual application of sufficient pulling force in the reverse direction to perform the same momentary widening of the clamp mouth up to the diameter of the rod to enable withdrawal therefrom, which is followed by immediate resilient snapping of the jaws 30 back to their default positions re-establishing the normal gap width G of the mouth 28.

The dial support body 32 of the primary mounting clamp 12 has a tab-like shape lying flush with a bottom end of the C-shaped clamp body 26, and spaced from the plane of the opposing top end of the C-shaped clamp body 26. The terms top end and bottom end are used in reference to the illustrated orientation only, and are not intended to denote a particular orientation in which the mounting clamp must be used. The dial support body 32 features two through-bores passing therethrough in the axial direction, particularly an inner axial through-bore 34 situated nearer to the C-shaped clamp body 26, and an outer axial through-bore 36 situated further outward from the C-shaped clamp body near a distal end of the dial support body 32. Each axial through-bore 34, 36 has a diameter equal to the outer diameter of the indicator dial's collar 24 and greater than the indicator dial's plunger 22. The indicator dial is selectively and removably attachable to the primary mounting clamp 12 by insertion of the plunger 22 through either of the axial through bore's 34, 36 from the top end of the dial-support body until the collar 24 is securely fitted into the selected through bore 34, 36 in frictional engagement with the boundary wall thereof. This snug fit between the collar 24 of the indicator dial and the surrounding material of the dial support body confidently holds the indicator dial in place on the primary mounting clamp, regardless of any re-orienting of same, until sufficient manual pulling force is used to free and separate the indicator dial from the mounting clamp. During installation and remove of the clamp 12 from the output rod of the actuator, the dial support body 32 also serves as a convenient manual grip for holding the clamp and forcing same onto and off of the actuator.

Secondary contact surface clamp 14 is not used to support the indicator dial 18, and instead is used on an actuator of the type shown in FIG. 2 to provide a contact surface that lies in a plane perpendicular to the axial direction 108 of the actuator for the working distal end 22a of the dial indicator's plunger 22 to act on. The secondary contact surface clamp 14 is similarly configured to the primary mounting clamp 12 in that it has a C-shaped clamp body 26' centered around a reference axis A to define two resiliently flexible clamping jaws 30 whose distal ends 30a are separated by a mouth opening 28 of predetermined gap width, and a tab-shaped body 32' projecting from a closed-side of the clamp body's C-shape in a radial direction perpendicular to reference axis A and coincident with the clamp's plane of symmetry. The tab-shaped body 32 of the secondary clamp 14 is not for the purpose of supporting the indicator dial 18 however, and instead forms a contact surface 32a for contact by the working distal end 22a of the dial indicator's plunger 22 during the end play measurement process. Accordingly, the tab-shaped body of the secondary contact surface clamp 14 is instead referred to as a contact surface body 32'. Also, the contact surface body 32' is flush with the top end of the clamp body, i.e. the end thereof opposite the dial-supporting body 32 of the primary mounting clamp 12.

FIG. 2 shows use of the primary and secondary clamps 12, 14 of FIG. 1 together with the dial indicator 10 thereof on a main landing gear actuator. The secondary contact surface clamp 14 is attached to the tubular extension 104 of the actuator 100 near the open end 104a thereof. To enable this, the jaw space and mouth of the secondary contact surface clamp have the same dimensional relationship with the outer diameter of the actuator's tubular extension 104 as the jaw space and mouth of the primary mounting clamp 12 do with the outer diameter of the actuator's output rod 106. Accordingly, the secondary contact surface clamp 14 is attached to the tubular extension 104 in the same snap-on, tool-free manner as described above for connection of the primary mounting clamp 12 to the actuator's output rod 106.

With the secondary contact surface clamp 14 securely held on the tubular extension 104 in a stationary position relative to the gear housing 102, the primary mounting clamp 12, with the dial indicator 10 supported thereon in the above described manner, is then likewise attached to the output rod 106 of the actuator. With both clamps 12, 14 attached to their respective parts of the actuator, the primary mounting clamp 12 is manually slid along the output rod 106 toward the contact surface 32a of the secondary contact surface clamp 14, which radiates outward in a normally oriented plane from the longitudinal axis shared by the actuator's tubular extension 104 and the output rod 106 concentrically received therein. The primary mounting clamp 12 is slid far enough to bring the distal working end 22a of the dial indicator's plunger 22 into forced contact against this contact surface 32a and to partially collapse or retract the plunger 22 into the dial 18. The plunger is thus displaced through a partial amount of its available travel by forcing the distal working end 22a of the plunger out of its normal spring-biased position. The needle indicator 20 will thus swing from an initial reading on the graduated scale to a different second value corresponding to the newly depressed position of the plunger. The strength of the static frictional grip between the clamp body 26 of the primary mounting clamp 12 and the output rod 106 of the actuator, and the strength of the static frictional grip between the transition collar 24 of the dial indicator and the dial support body 32 of the primary mounting clamp 12, each exceed the spring force of the dial indicator's plunger 32. Accordingly, manual release of the primary mounting clamp 12 and attached dial indicator 10 at this point will not disrupt the statically held position of these components on the output rod 106 of the actuator.

To measure the end play of the actuator, a pull stroke is performed by applying a pull force to the output rod 106 of the actuator in the axial direction away from the gear housing 102, and the displacement value indicated on the graduated dial scale by the indicator needle 20 at the terminal end of this pull stroke is visually read from the face of the dial. Likewise, a push stroke is performed by applying a push force to the output rod 106 of the actuator in the axial direction toward the gear housing 102, and the displacement value indicated on the graduated dial scale by the indicator needle 20 at the terminal end of this push stroke is visually read from the face of the dial. The total amount of axial play present in the linear actuator is thus determined as the difference between these two readings from the dial indicator 10. The amount of force applied in either stroke may be a predetermined force value prescribed by the maintenance guidelines for the aircraft in question.

The particular order in which the pull and push strokes are performed may be varied. Similarly, the order of whether the primary mounting clamp is slid into place before or after the indicator dial is installed thereon may be varied. That is, the primary mounting clamp 12 may be slid into close enough proximity to the installed secondary contact surface clamp 14 so that subsequent insertion of the transition collar 24 of the dial indicator 10 into the dial support body 32 of the primary mounting clamp will ensure partial collapse of the dial indicator's plunger 22, thereby defining a suitable starting point for the push and pull strokes of the end play test. As another alternative to positioning the primary mounting clamp 12 and dial indicator 10 in place near the secondary contact surface clamp 14 and then applying pull and push forces, one could apply the pull or push force before installing the primary clamp 12 and dial indicator 10, and continue to hold this first pull or push force while setting the primary mounting clamp 12 and dial indicator 10 in place relative to the secondary contact surface clamp 14, then read the indicated value from the graduated dial while still holding this initial push/pull force, and then apply the opposing push/pull force and read the changed value from the graduated dial. The end play measurement is once again the difference between the two values on the graduated dial scale from the graduated dial with the directionally different forces applied.

The end play measurements can be repeated for varying degrees of output rod extension, as may again be dictated by prescribed maintenance standards, for example by installing the primary and secondary clamps 12, 14 on a nearly fully retracted output rod and performing the push and pull strokes to determine the respective end play measurement, then operating the actuator in the extension direction, and either holding the primary mounting clamp 12 close to the secondary contact surface clamp 14 during this extension, or by allowing the primary mounting clamp 12 to ride along with the extending output rod, and then once the necessary degree of extension has been reached, sliding the primary mounting clamp 12 back toward the housing 102 into sufficient proximity to the secondary contact surface clamp 14.

The alternative mounting clamp 16 in FIG. 1 is intended for use on the nose landing gear actuator of FIG. 4 when testing the end play thereof in a substantially collapses state of its output rod 106. For example, it is known for at least one commercially available actuator of this type that proper maintenance requires recording an end play measurement when the actuator is extended by only one turn of its motor driven input shaft, which results in exposure of only a very small axial length of the output rod 106' between the end wall 102a of the gear housing 102 and the nearest end (i.e. proximal end) of the compression spring 112 that is coiled around the output rod 106 near the distal end thereof. The primary mounting clamp 12 has an axial thickness measured parallel to reference axis A between the top end and bottom end of the C-shaped clamp body 26 thereof that exceeds the exposed axial length of the nose landing gear's output rod 106 in the substantially collapsed state thereof. That is, the limited amount of exposed circumferential area of the output rod 106 in this substantially collapsed state of the actuator 100' is insufficient to accommodate clamping of the primary mounting clamp 12 to the output rod 106.

The alternative mounting clamp 16 features an axially thinner design intended to fit within this limited area of output rod exposure in the substantially collapsed state of the nose landing gear actuator 100'. In more extended states of the nose landing gear actuator 100', and in most or all of the main landing gears various states of collapse/extension, the thicker primary mounting clamp 12 is accommodated by the available space between the compression spring and the opening in the main gear housing or tubular extension from which the output rod 106 extends. When such clamp-accommodating space on the output rod 106 is available, the thicker primary mounting clamp 12 is used instead of the thinner alternative mounting clamp 16 in order to ensure a robust contact area between the output rod 106 and the thick primary mounting clamp 12 that will confidently hold the primary mounting clamp 12 and attached dial indicator 10 in place and prevent the clamp from wobbling or tilting out of proper alignment with the output rod's longitudinal axis.

The clamp body 26" of the alternative mounting clamp 16 has an inner area 40 of lesser thickness in the axial direction than a surrounding outer circumferential area 42 of the clamp body. The inner area 40 thus forms a flange 40a that juts inwardly from the thicker outer circumferential area 42 at the bottom end of the clamp body, while leaving an axially recessed cavity space that situated above the flange 40a and surrounded by a circumferential rim 42a defined by an upper extent of the thicker outer circumferential area 42. Once again, the clamp body is generally C-shaped when viewed from planes lying normal to the reference axis around which the C-shaped curvature of the clamp body extends, and is symmetrically bisected by a plane of symmetry that contains reference axis A and bisects the open mouth 28 left between the distal ends 30a of the two halves or jaws 30 of the clamp body. The inner flange-like area 40 of the clamp body 26" thus delimits a jaw space of normally equal or slightly lesser diameter than the output rod 106 of the actuator 100' in order to enable snap-fit attachment thereto in the same manner as the primary mounting clamp 12, but at the limited circumferential area of the output rod in the substantially collapsed state thereof, as enabled by the reduced-thickness of this flange-like inner area 40 of the alternative mounting clamp 16.

A dial support body 32" projects from the closed side of the C-shaped clamp body 26" of the alternative mounting clamp 16 in the radial direction matching the clamp's plane of symmetry. This dial support body 32" features only a single axial through-bore 34 that matches the position of the inner through-bore 34 of the dual-bore primary mounting clamp 12. The alternative mounting clamp's dial support body 32" exceeds the remainder of the alternative mounting clamp in terms of its axial thickness, having a bottom end that resides flush with the bottom plane shared by the inner and outer areas 40, 42 of the clamp body 26", and an opposing top end that is elevated relative to the top end of the clamp body 26".

As shown in FIG. 4, the proximal end of the compression spring 12 reaches into the axially recessed cavity at the top end of the alternative mounting clamp 16 when installed on the substantially collapsed output rod 106 of the nose landing gear actuator 100'. To accommodate this, the diameter D of the axially recessed cavity in the default unflexed state of the clamp body 26" is equal to or slightly exceeds the outer diameter of the coiled compression spring 112, whereby the rim 42a of the thicker outer circumferential area 42 of the clamp body closely surrounds a proximal end portion of the spring 112. This fitting of the rim 42a around the spring affords extra stability to the alternative mounting clamp 16 to prevent tilting of same out of a properly working orientation in which the reference axis A of the alternative mounting clamp aligns with the axial direction of the output rod, compared to if the only stability was that afforded by the very small contact area between the thinner inner area 40 of the clamp body 26" and the very little exposed circumferential area of the output rod 106 between the gear housing 102 and the proximal end of the spring 112.

The end play testing process on the nose landing gear actuator of FIG. 4 is the same as that described for the main landing gear actuator, except that the contact area against which the plunger 22 of the dial indicator 10 is forced is not defined by the secondary contact surface collar 14, which is not used when testing the nose landing actuator. Instead, the contact surface acted on by the distal end 22a of the dial indicator's plunger 22 is the end wall 102a of the actuator's gear housing 102, since the nose landing gear actuator 100' lacks the tubular extension 104 found in the main landing gear actuator. As the end wall 102a of the gear housing 102 projects a lesser radial distance outwardly from the output rod 106 than the tab-shaped contact surface body 32' of the secondary contact surface clamp 14, the inner through-bore 34 of the primary mounting clamp 32 is used when performing the end play test on the output rod of the nose landing gear actuator 100' in notably extended states thereof, while the end play test on the main landing gear actuator 100 may instead use the outer axial through-bore 36 to support the dial indicator.

FIG. 4 specifically shows the dial indicator 10 in use on the alternative mounting clamp 16 during performance of an end play test with the output rod in the substantially collapsed state. In this instance, since such limited circumferential area of the output rod is available, the alternative mounting clamp 16 cannot be axially slide into place. Instead, it is clamped onto the limited available area of the output rod 106 in the snap-on manner described above in relation to the primary mounting clamp 12, except that instead of purely relying on contact between the clamp body and the output rod to hold the mounting clamp 16 stable in the proper orientation, it also relies on additional contact or close proximity between the outer rim 42a of the clamp body 26" and the outer periphery of the coiled compression spring 112. With the alternative mounting clamp 16 in place, the dial indicator 10 is seated into a proper working position by sliding the plunger 22 through the single available through-bore 34 of the alternative mounting clamp 16 by a sufficient distance to partially collapse the plunger 22 through forced contact of the distal working end 22a thereof against the gear housing's end wall 102a, and to frictionally secure the transition collar 24 of the dial indicator 10 within the through-bore 34. The push and pull forces are then exerted on the output rod 106 as described above for the main landing gear actuator 100, and the maximum difference in the dial readings taken during these push and pull strokes is taken as the end play measurement for the nose landing gear 100' in the substantially collapsed state thereof.

It will be appreciated that various modifications can be made in the invention as herein above described, and many apparently widely different embodiments of same made, and so it is intended that all matter contained in the accompanying specification shall be interpreted as illustrative only and not in a limiting sense.

The invention claimed is:

1. An end play measurement apparatus for measuring end play of a linear actuator, said apparatus comprising:
    a dial indicator having a graduated dial and a plunger radiating outward therefrom in a radial direction, said plunger being displaceable back and forth in said radial direction and connected to an internal mechanism of the dial indicator by which displacement of said plunger causes an indicator needle of said dial indicator to move about said graduated dial to reflect a measurement of said displacement;
    a primary mounting clamp comprising a clamp body configured to releasably clamp onto an output rod of said linear actuator, and a dial support body projecting outwardly from said clamp body and configured to the support the dial indicator thereon in a working position in which the plunger reaches axially along the output rod toward a gear housing of said linear actuator to abut against a contact surface carried on a stationary portion of the actuator relative to which the output rod undergoes displacement during operation of said actuator; and
    a secondary clamp of larger clamp diameter than the primary mounting clamp for releasable clamping of the secondary clamp onto a tubular part of the actuator's stationary portion near an open end of said tubular part from which the output rod extends, said secondary clamp having a contact body projecting outwardly from said clamp body to align with the dial support body of the mounting clamp and define said contact surface that receives a distal working end of the plunger, whereby the plunger is displaceable by relative movement between the output rod and the tubular part of the actuator in order to show a measure of said relative movement on the dial indicator.

2. The apparatus of claim 1 wherein the mounting clamp is a quick release clamp with tool-free coupling and decoupling functionality.

3. The apparatus of claim 1 wherein the mounting clamp is a snap-on clamp.

4. The apparatus of claim 1 wherein the mounting clamp comprises a pair of jaws reaching in a common direction from the dial support body and leaving an open mouth between distal tips of said jaws to accommodate receipt of the output rod of the actuator through said open mouth.

5. The apparatus of claim 4 wherein said jaws are resiliently flexible away from one another to widen said open mouth from a default width thereof to an expanded width exceeding a diameter of the output rod.

6. The apparatus of claim 1 comprising an alternative mounting clamp that, like the primary mounting clamp, has a respective clamp body and a respective dial support body projecting outwardly therefrom to carry the dial indicator, the respective clamp body of said alternative mounting clamp having a reduced axial thickness relative to the clamp body of said primary mounting clamp, at least at an inner area of said respective clamp body that immediately surrounds the output rod of the actuator when clamped thereto, whereby said reduced axial thickness accommodates use of said alternative mounting clamp in place of said primary mounting clamp on a different linear actuator whose output rod is in a substantially collapsed state that substantially reduces an available circumferential clamping area of the output rod left exposed outside a remainder of said different linear actuator.

7. The apparatus of claim 6 wherein the dial indicator comprises a transition collar that is attached to the graduated dial and from which the plunger of the dial indicator projects, and the respective dial support body of the alternative mounting clamp comprises a respective axial through-bore therein sized to receive said transition collar of the dial indicator in a frictionally engaged manner holding said dial indicator securely on said primary alternative clamp.

8. The apparatus of claim 1 wherein the dial indicator comprises a transition collar that is attached to the graduated dial and from which the plunger of the dial indicator projects, and the dial support body of the primary mounting clamp comprises an axial through-bore therein sized to receive said transition collar of the dial indicator in a frictionally engaged manner holding said dial indicator securely on said primary mounting clamp.

9. The apparatus of claim 8 wherein the dial support body of the primary mounting clamp comprises a second axial through-bore therein for selective receipt of the dial indicator clamp in either of said axial through-bores of said primarily mounting clamp according to a location of the contact surface on a current linear actuator being tested.

10. A method taking an end play measurement of a linear actuator, said method comprising:
    (a) removably attaching a mounting clamp to an output rod of a linear actuator, and removably mounting a contact surface on a stationary portion of the actuator relative to which the output rod is displaceable by operation of said actuator;
    (b) supporting a dial indicator on said mounting clamp in a position in which a distal working end of a plunger of the dial indicator abuts said contact surface; and
    (c) monitoring a positional change of the indicator needle on the graduated dial that takes place between exertion of a pulling force on said output rod and exertion of a pushing force on said output rod, and thereby obtaining an end play measurement of said actuator as a difference between values respectively indicated on said graduated dial by the indicator needle during the exertion of the pulling and pushing forces;

wherein removably mounting the contact surface to the stationary portion of the actuator in step (a) comprises removably mounting a secondary mounting clamp to a tubular part of the actuator's stationary portion to define the contact surface thereon, said tubular part having an open end through which the output rod of the actuator extends.

11. The method of claim 10 wherein step (a) comprises sliding said mounting clamp along said output rod toward the contact surface to push the distal working end of the plunger of the dial indicator into contact with the contact surface carried on said stationary portion of the actuator.

12. The method of claim 11 wherein:
sliding the primary mounting claim in step (a) comprises sliding said primary mounting clamp beyond a state of contact between the distal working end of the plunger and the contact surface to achieve a partially retracted state of said plunger toward the graduated dial; and
step (c) comprises performing push and pull strokes on the output rod of the actuator after releasing said primary mounting clamp, and during performance of said push and pull strokes on the output rod, measuring a difference between a position of the indicator need on the graduated dial at a terminal point of a pull stroke and a position of the indicator needle on the graduated dial at a terminal point of a push stroke, thereby obtaining the end play measurement of said actuator.

13. An end play measurement apparatus for measuring end play of a linear actuator, said apparatus comprising:
a dial indicator having a graduated dial and a plunger radiating outward therefrom in a radial direction, said plunger being displaceable back and forth in said radial direction and connected to an internal mechanism of the dial indicator by which displacement of said plunger causes an indicator needle of said dial indicator to move about said graduated dial to reflect a measurement of said displacement; and
a primary mounting clamp comprising a clamp body configured to releasably clamp onto an output rod of said linear actuator, and a dial support body projecting outwardly from said clamp body and configured to the support the dial indicator thereon in a working position in which the plunger reaches axially along the output rod toward a gear housing of said linear actuator to abut against a contact surface carried on a stationary portion of the actuator relative to which the output rod undergoes displacement during operation of said actuator;
wherein the dial indicator comprises a transition collar that is attached to the graduated dial and from which the plunger of the dial indicator projects; and the dial support body of the primary mounting clamp comprises first and second axial through-bores therein that are each sized to receive said transition collar of the dial indicator in a frictionally engaged manner holding said dial indicator securely on said primary mounting clamp, whereby the transition collar of the dial indicator is receivable in either of said axial through-bores of said primarily mounting clamp according to a location of the contact surface on a current linear actuator being tested.

* * * * *